United States Patent
Schuchard et al.

(10) Patent No.: US 6,241,354 B1
(45) Date of Patent: Jun. 5, 2001

(54) SPRING HINGE

(75) Inventors: Klaus Schuchard, Neuenbürg; Reiner Wagner, Ispringen, both of (DE)

(73) Assignee: OBE Ohnmacht & Baumgärtner GmbH & Co. KG (DE)

( * ) Notice: Subject to any disclaimer, the term of this patent is extended or adjusted under 35 U.S.C. 154(b) by 0 days.

(21) Appl. No.: 09/485,655

(22) PCT Filed: Aug. 5, 1998

(86) PCT No.: PCT/EP98/04867
§ 371 Date: May 8, 2000
§ 102(e) Date: May 8, 2000

(87) PCT Pub. No.: WO99/09450
PCT Pub. Date: Feb. 25, 1999

(30) Foreign Application Priority Data

Aug. 14, 1997 (DE) .............................................. 197 35 230

(51) Int. Cl.⁷ ...................................................... G02C 5/16
(52) U.S. Cl. .............................. 351/113; 351/153; 16/228
(58) Field of Search .................................. 351/113, 111, 351/140, 153, 41, 158; 16/228

(56) References Cited

U.S. PATENT DOCUMENTS

| | | | |
|---|---|---|---|
| 4,244,081 | 1/1981 | Beyer et al. | 16/128 |
| 4,306,779 | 12/1981 | Rege | 351/118 |
| 4,818,093 | 4/1989 | Tabacchi | 351/113 |
| 5,657,107 | 8/1997 | Wagner et al. | 351/113 |
| 5,953,791 * | 9/1999 | Da Forno | 351/153 |

FOREIGN PATENT DOCUMENTS

| | | |
|---|---|---|
| 8117403 | 12/1981 | (DE) . |
| 9210056 | 10/1992 | (DE) . |
| 9114917 | 5/1993 | (DE) . |
| 4415307 | 11/1995 | (DE) . |
| 19511167 | 10/1996 | (DE) . |
| 0426947 | 5/1991 | (EP) . |
| 0679920 | 11/1995 | (EP) . |
| 2268282 | 1/1994 | (GB) . |

* cited by examiner

*Primary Examiner*—Hung Xuan Dang
(74) *Attorney, Agent, or Firm*—Ostrolenk, Faber, Gerb & Soffen, LLP

(57) ABSTRACT

The invention relates to a spring hinge for spectacles, having a housing (3), a hinge part (5), which is arranged such that it can be displaced at least partially within the housing (3), a closure part (7), which is arranged in the housing (3), a spring (9), which is supported on the hinge part (5), on the one hand, and on the closure part (7), on the other hand, and having a stop device which has two stop elements. The invention is distinguished in that one stop element (33) is arranged on the hinge part (5), and the other stop element (63, 67) is arranged on the housing (3) or on the closure part (7), such that the capacity of the hinge part (5) for displacement counter to the spring force of the spring (9) is limited to a predetermined distance (w).

17 Claims, 10 Drawing Sheets

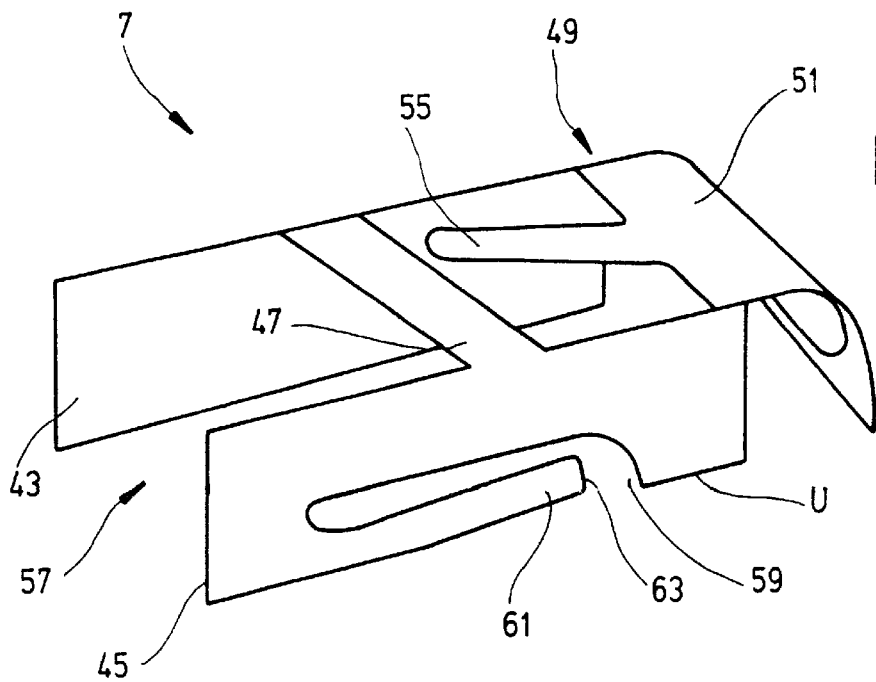
Fig. 3d
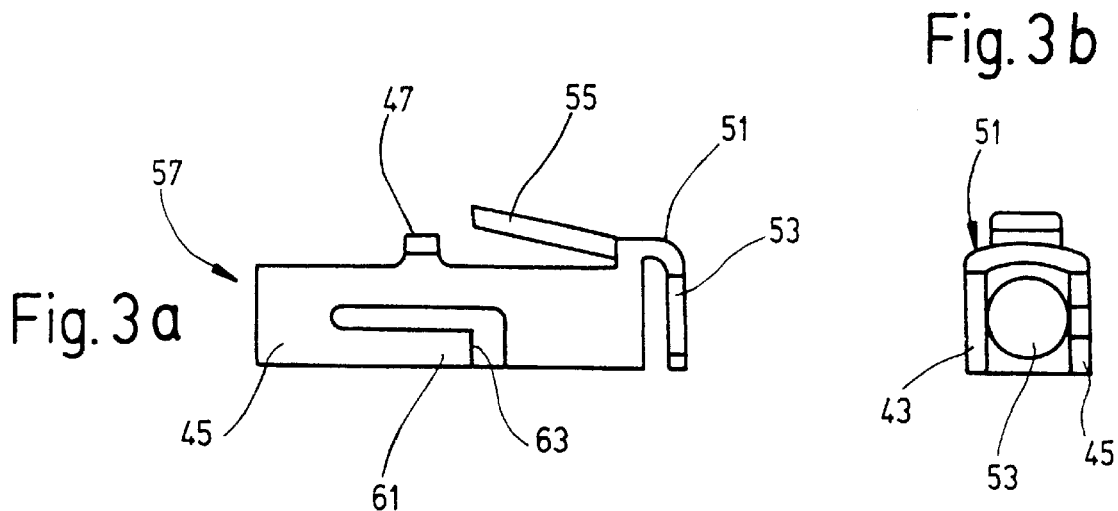
Fig. 3a
Fig. 3b
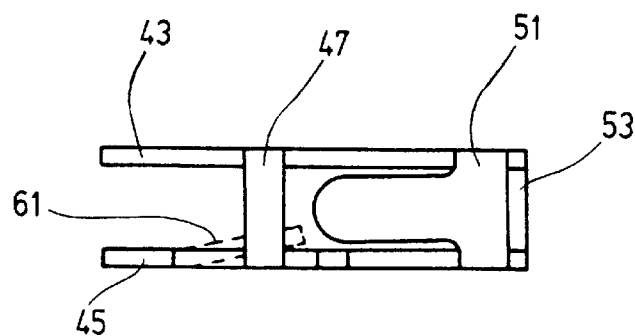
Fig. 3c

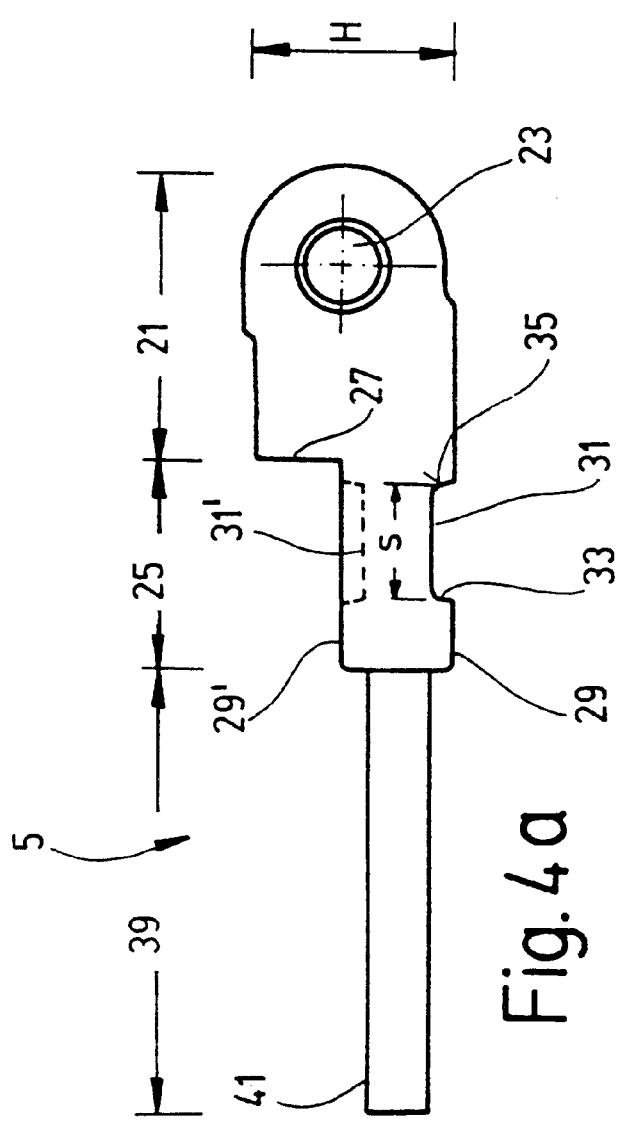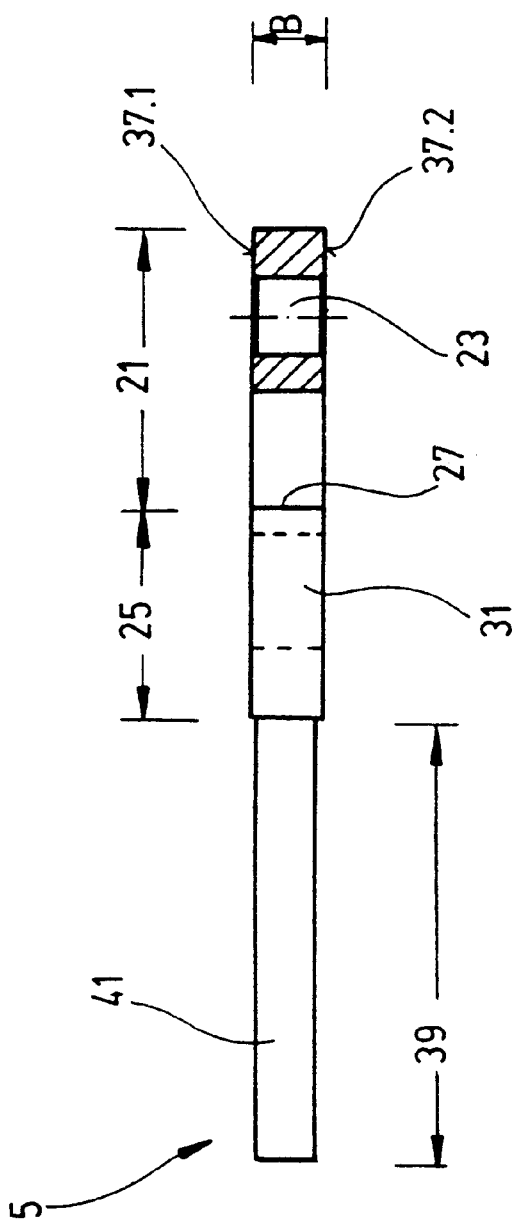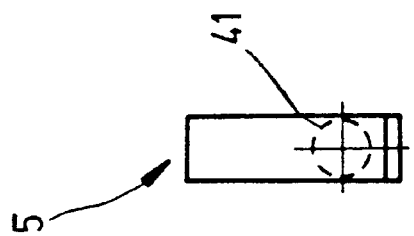

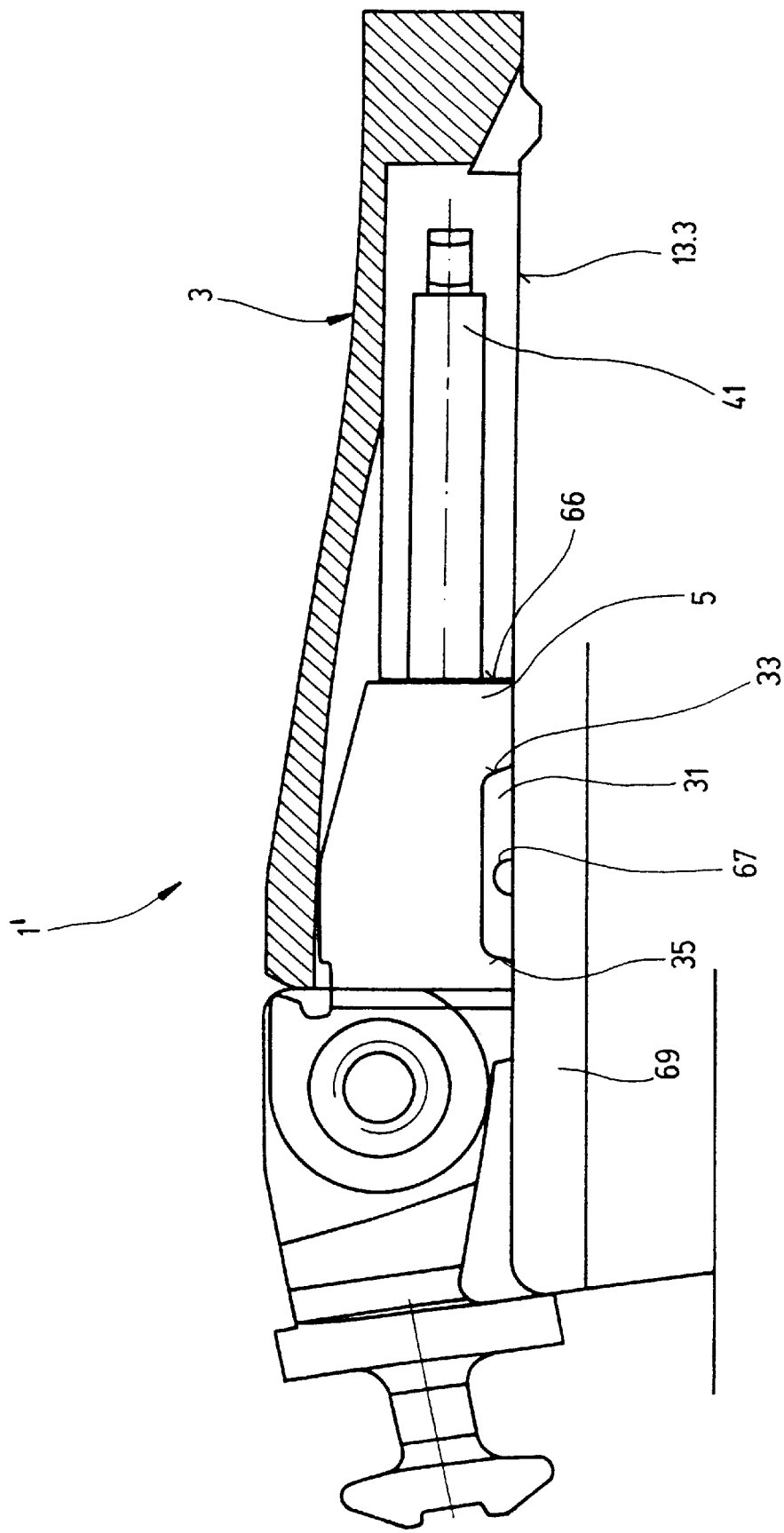

SPRING HINGE

DESCRIPTION

The invention relates to a spring hinge for spectacles, having a housing, a hinge part, which is arranged such that it can be displaced at least partially within the housing, a closure part, which is arranged in the housing, and a spring, which is supported on the hinge part, on the one hand, and on the closure part, on the other hand, and having a stop device which has two stop elements.

Spring hinges for spectacles have been known for some time now. They have a housing in which a hinge part is arranged such that it can be displaced counter to the force of a spring. If the side piece of the spectacles on which the housing is positioned is pivoted further outward from the swung-open position, the spring is compressed. There is often the problem in this case of the spring being compressed to the full extent. This means that the spring has reached its minimum spring length and cannot be compressed further. However, this adversely affects the spring properties. In the worst case, the spring may be destroyed as a result.

In order to solve this problem, the prior art has provided stop elements which are to prevent the spring from being compressed to its minimum length. Thus, for example, DE 91 14 917 U1 discloses a stop device which is provided externally, that is to say outside the spring-hinge housing. It comprises a first stop element, which is provided in the region of the hinge eyelet, and a second stop element, which is formed by the central part, which is connected to the side piece of the spectacles via the hinge. The functioning of the stop device thus depends essentially on how the hinge part connected to the side piece of the spectacles is positioned on the central part. Since this work is carried out by the manufacturer of the spectacle frame, the manufacturer of the spring hinge thus has no influence on the satisfactory functioning of the stop device.

EP 0 426 947 discloses a stop device which is arranged within the spring-hinge housing. In this case, the first stop element is formed by a pin serving for guiding the spring, while the second stop element is in the form of an extension which is provided on the hinge part and extends virtually over the entire length of the hinge housing. This arrangement has the disadvantage that it involves high outlay and is thus expensive.

SUMMARY OF THE INVENTION

The object of the invention thus consists in providing a spring hinge for spectacles which has a cost-effective stop device which is easy to produce.

This object is achieved by a spring hinge which has the features of claim 1. Since one of the two stop elements is arranged on the hinge part, and the other stop element is arranged on the housing or on the closure part, it is possible to provide a cost-effective stop device which is easy to produce and is located within the housing. The closure part is to be understood in this context as that part which serves as fixed abutment for the spring. This closure part may either be formed integrally with the housing or be a part which is to be introduced separately into the housing.

In an advantageous development of the invention, the closure part has an elastic tongue which has a free end, is bent toward the hinge part and engages in a cutout on the hinge part and interacts, as the second stop element, with the first stop element. The elastic tongue of the closure part thus results in a double function. On the one hand, it forms the stop element by way of its free end, with the result that the capacity of the hinge part for displacement counter to the spring force is limited to a predetermined distance; on the other hand, it forms a loss-prevention means for the hinge part since it is bent toward said hinge part and engages in the cutout formed on the hinge part. This provides a latching device which prevents the hinge part, once inserted into the closure part, from being able to slide out again. This simplifies the assembly of the spring hinge to a considerable extent since there is now no need to ensure that any part is located in the predetermined position during closure of the housing. Moreover, the hinge part is locked in the closure part itself, with the result that particularly straightforward assembly of the spring hinge can take place. Furthermore, it is advantageous for the hinge part and closure part to be provided as a preassembled unit. All that is then required for the assembly of the spring hinge is for the unit preassembled from the hinge part, spring and closure part to be introduced or pushed into the housing, with the result that it may then be closed off by a side piece of the spectacles. Of course, however, it is also possible to use a closed housing which merely has an opening on the end side, the preassembled unit being pushed through said opening.

In an advantageous development of the invention, the hinge part has a groove which extends in the longitudinal direction, the second stop element engaging in said groove. A wall of said groove serves as the first stop element in this case. This development is particularly advantageous because the groove has already been provided for other reasons in the prior-art hinge parts. Thus, all that is required to provide the stop device according to the invention is to provide the second stop element.

In an advantageous development of the invention, the closure part encloses at least one longitudinal section of the hinge part and thus serves as a guide.

In an advantageous development of the invention, the locking element has a closure part which interacts with locking action with a cutout in the housing.

In an advantageous development of the invention, the groove is provided on that side of the hinge part which is directed toward the underside of the housing. The side referred to as the underside of the housing is that which is directed toward the side piece of the spectacles.

In an advantageous development of the invention, a protrusion is provided on the housing, and the protrusion serves as the second stop element and engages in the groove of the hinge part. For production reasons, this embodiment is advantageous when the underside of the housing is formed by the side piece of the spectacles. The underside of the spring-hinge housing itself is open.

In an advantageous development of the invention, the closure part and the tongue, serving as the second stop element, are designed in one piece.

Further advantageous configurations are specified in the subclaims.

BRIEF DESCRIPTION OF THE DRAWING

The invention will now be described in more detail by way of exemplary embodiments with reference to the drawing, in which:

FIGS. 3a to d show various views of a closure part, FIG. 4 shows three views of a hinge part, FIG. 5 shows a schematic illustration of a fourth exemplary embodiment of a spring hinge in a first position.

DESCRIPTION OF THE PREFERRED EMBODIMENTS

Figure 1A:
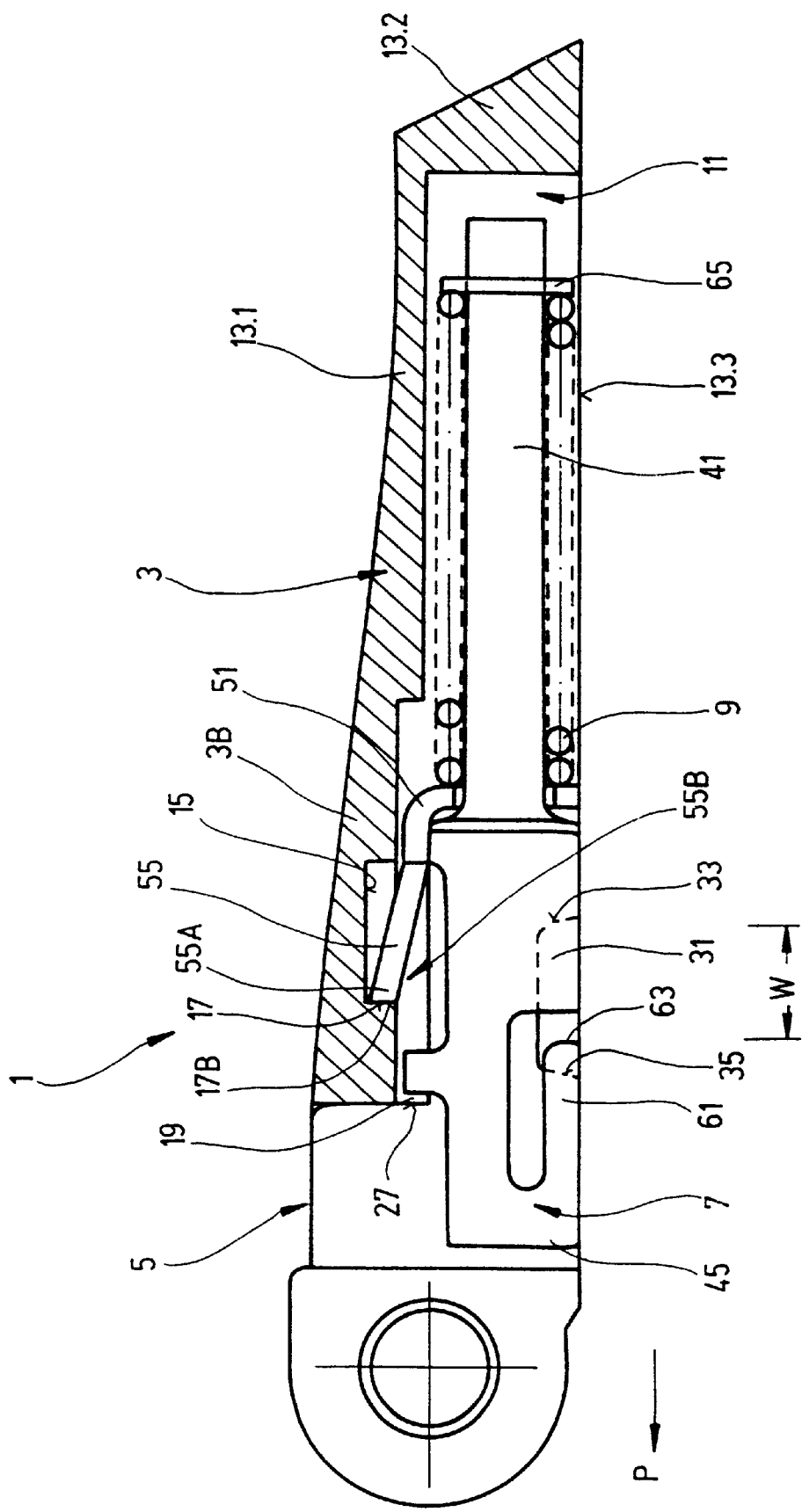
FIG. 1A shows a schematic illustration of a first exemplary embodiment of a hinge in a first position.

FIG. 1A illustrates, schematically, a spring hinge 1 which is used, in spectacles, for connecting a side piece of the spectacles to a central-part hinge provided on the spectacle mount. The spring hinge 1 comprises an elongate spring-hinge housing 3, referred to hereinbelow as housing for short, a hinge part 5, a closure part 7 and a spring 9 which is illustrated purely schematically.

In the present exemplary embodiment according to FIG. 1A, the housing 3 is of cross-sectionally rectangular design, although the cross section changes in the longitudinal direction. Of course, other cross-sectional shapes are also conceivable. The housing 3 has a cutout 11 which, depending on requirements, is of cross-sectionally rectangular design or is designed in a circular manner as a bore. The elongate cutout 11 extends in the longitudinal direction of the housing 3 and is bounded by five housing walls 13, it being possible for the housing walls 13.1, 13.2 and 13.3 to be seen in FIG. 1A. The other two housing walls are located parallel to the plane of the drawing and cannot be seen.

In the housing wall 13.1, which is located at the top in FIG. 1A and is also referred to as top side, there is provided, on the side which is directed toward the cutout 11, a cutout 15 which has at least one wall 17 extending perpendicularly to the longitudinal direction of the housing. This wall 17 is directed toward that longitudinal end of the housing 3 which has an opening 19 of the cutout 11.

The hinge part 5, which is illustrated in detail in FIG. 4, has a first longitudinal section 21, which is referred to as the hinge eyelet and has a bore 23. Said bore 23 runs perpendicularly to the longitudinal direction of the hinge part 5 and serves for receiving a screw which connects the hinge part 5 pivotably to a further hinge part 1A (FIGS. 1B and 1C) of the central-part hinge. The longitudinal section 21 is adjoined by a second longitudinal section 25 of lesser height H, with the result that a step 27 is formed between the longitudinal section 21 and longitudinal section 25.

Provided on the underside 29 of the longitudinal section 25 is a cutout 31 which extends in the longitudinal direction over a distances and is preferably realized by the material being impressed. The cutout 31 is bounded in the longitudinal direction by a first shoulder 33 and a second shoulder 35, the shoulder 35 being directed toward the longitudinal section 21. As is indicated by dashed lines in FIG. 4b, the recess 31 extends over the entire width B of the longitudinal section 25. This means that the cutout 31 is open in the direction of both longitudinal sides 37.1 and 37.2. However, it is also conceivable for the cutout 31 to be open merely in the direction of one longitudinal side 37. It is also possible, however, to form a cutout 31' (illustrated by dashed lines) on the underside 29' of the longitudinal section 25, depending on how the closure part 7 is inserted into the housing 3.

The longitudinal section 25 is adjoined by a further longitudinal section 39, which is referred to hereinbelow as bolt 41. In the present exemplary embodiment, the bolt 41 is of cross-sectionally round design, which is illustrated by dashed lines in FIG. 4c. Said bolt 41 serves for guiding the spring 9 and has a diameter which is smaller than the height of the longitudinal section 25.

FIG. 4c also shows that the longitudinal sections 21 and 25 are of cross-sectionally rectangular design.

The closure part 7, which is illustrated in detail in FIG. 3, has two longitudinally extending, mutually parallel side walls 43 and 45 which are connected to one another via a web 47 on a longitudinal side, in the present exemplary embodiment on the top side. Furthermore, provided at a longitudinal end 49 of the two side walls 43, 45 is a termination element 51, which is provided on the top sides of the two side walls 43, 45 and extends in arcuate form to the underside of the U of the closure part. This termination element 51 forms something of a longitudinal termination of the closure part 7. As can clearly be seen in FIG. 3a, the termination element 51 has a preferably circular through-passage 53.

Furthermore, the termination element 51 has a resilient lug 55 which extends in the longitudinal direction to the longitudinal side 57 of the closure part 7, said longitudinal side being located opposite the termination element 51. Furthermore, the lug 55 is bent upward, that is to say away from the side walls 43, 45. In relation to the illustration in FIG. 3a, the lug 55 thus extends from the bottom right to the top left.

The side wall 45 has a cutout 59, of which the border is open in the direction of the underside U and which extends in the longitudinal direction of the closure part 7. Projecting into said cutout 59 is a tongue 61 which likewise extends in the longitudinal direction and is connected to the side wall 45 at its end which is directed toward the longitudinal side 57. The side wall 45 and tongue 61 are preferably designed in one piece.

The tongue 61 has a free end 63, said end thus not being connected to the side wall 45 and being located within the space which is defined by the two side walls 43 and 45.

It can clearly be seen in FIG. 3c that the tongue 61 is bent inward, that is to say toward the center of the closure part 7. Appropriate material selection gives the tongue 61 elastic properties, with the result that it can be pressed into the plane formed by the side wall 45.

Upon assembly of the spring hinge 1 shown in FIG. 1A, first of all the hinge part 5 is introduced, by way of its longitudinal section 39, into the closure part 7 from the longitudinal side 57. In the introduced position, the entire longitudinal section 25 is located within the closure part 7, the bolt 41 engaging through the opening 53. In this case, the web 47 engages over the longitudinal section 25.

The spring 9 is then positioned on the bolt 41 and clamped in between the termination element 51 and a schematically illustrated fastening device 65 provided at the opposite end of the bolt 41. The fastening device 65 is, for example, a ring which has been placed in position or merely a pinched section 65' (FIGS. 1B and 1C) of the bolt 41.

This unit comprising the hinge part 5, closure part 7 and spring 9 is then introduced into the cutout 11 of the housing 3 such that the lug 55 latches into the cutout 15 and locks the unit.

In that position of the hinge part 5 relative to the closure part 7 which is shown in FIG. 1A, the free end 63 of the tongue 61 is located in the region of the adjacent cutout 31. The free end 63 is spaced apart from the shoulder 33 by a distance which is designated w in FIG. 1.

Figure 2:
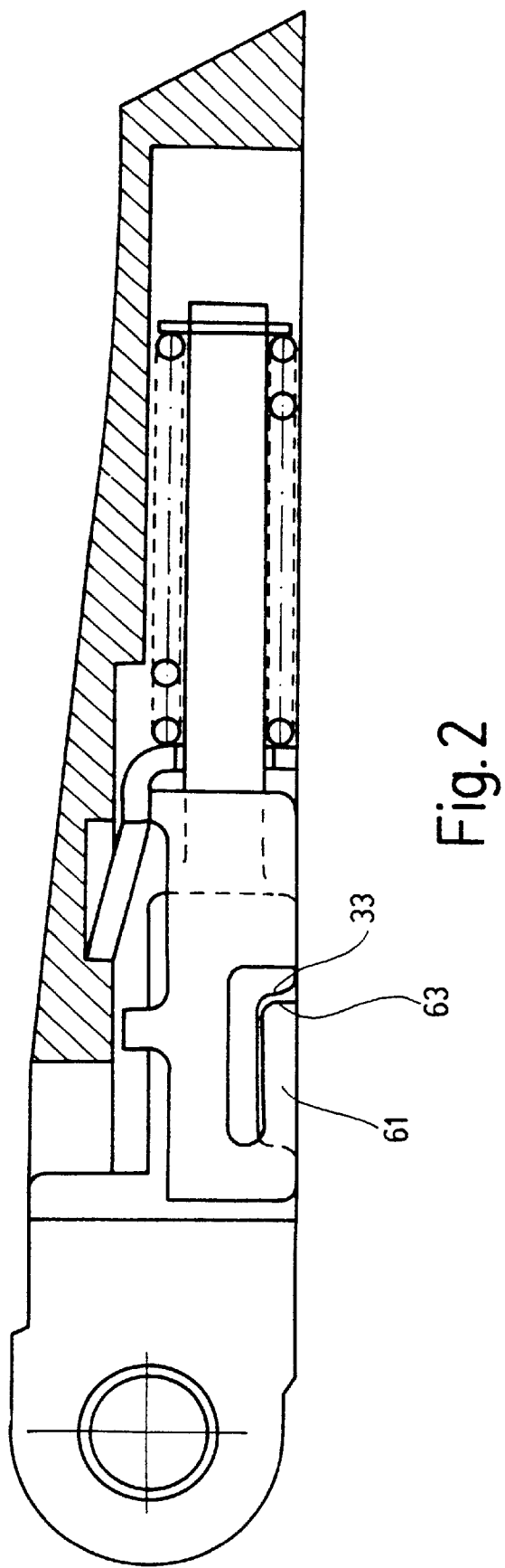
FIG. 2 shows the exemplary embodiment shown in FIG. 1A, in a second position.

If the hinge part 5 is then displaced in the direction of the arrow P, which takes place, for example, when the side piece of the spectacles is subjected to excessive pressure, the shoulder 33 is displaced in the direction of the free end 63. This also results, however, in an increase in that longitudinal section of the tongue 61 which is located in the region of the two shoulders 33 and 35, that is to say of the cutout 31. As a result of the resilient property of the tongue 61, the latter engages in the cutout 31, as displacement increases, perpendicularly to the plane of the drawing of FIG. 1A. As soon as the hinge part 5 has been displaced in the arrow direction P by the distance w, the shoulder 33 strikes against the free end 63 of the tongue 61. This position is illustrated in FIG. 2, the same parts being given the same designations. It can clearly be seen that the free end 63 of the tongue 61 butts directly against the shoulder 33. As a result, the free end 63, which projects into the cutout 31, limits the displacement distance of the hinge part 5 counter to the spring force of the spring 9. It can be seen from FIGS. 1A and 2 that the maximum displacement distance corresponds to the distance w.

The tongue 61 with the free end 63 thus serves as a stop element which interacts with the other stop element, formed by the shoulder 33 of the cutout 31. Since the cutout 31 is already present in the prior-art hinge part 5, a stop device which limits the displacement distance can be provided merely by providing the tongue 61 on the already present closure part 7. Additional components are not necessary for this purpose.

Figure 1B:
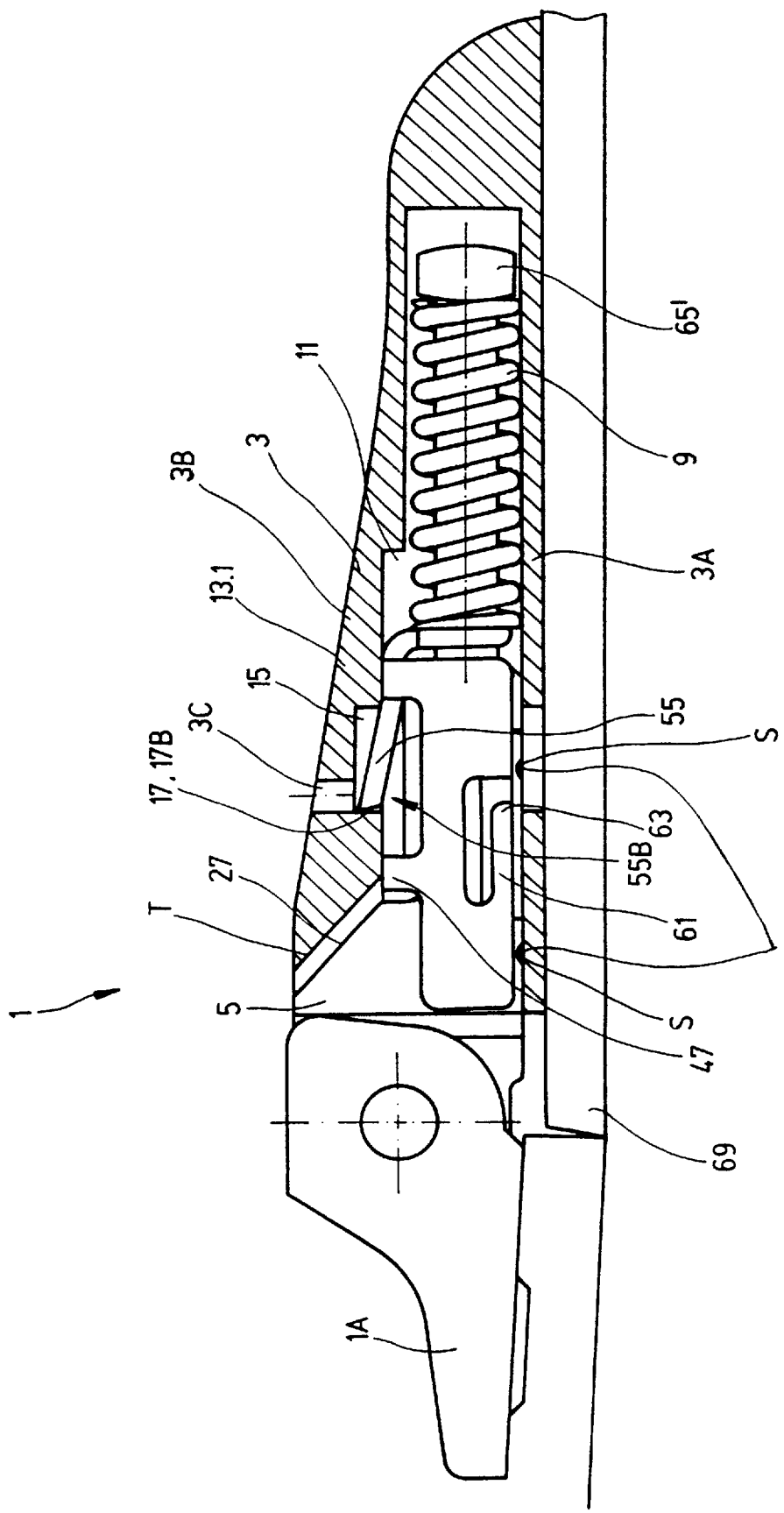
FIG. 1B shows a schematic illustration of a second exemplary embodiment of a spring hinge.

FIG. 1B represents a second exemplary embodiment of a housing 3. Parts which are the same, or have the same action, as in FIGS. 1A and 2 to 4 are provided with the same designations, so that it is merely the differences in relation to the housing 3 in FIG. 1A which will be discussed here. The hinge part 5 has a step 27 which runs at an angle to an imaginary horizontal. The longitudinal sections 21 and 25 (FIG. 4a) of the hinge part 5 are thus connected to one another via a slanting plane. The end side T of the housing 3 or the top housing wall 13.1 is of corresponding design. The end wall T thus forms a stop with the step 27, with the result that the hinge part 5 cannot be drawn too far into the housing 3 or into the cutout 11.

Provided in the top housing wall 13.1 is a through-passage 3C which opens out in the cutout 15. The lug 55 of the closure part 7 can thus be actuated by an object which can be inserted into the through-passage 3C, with the result that it is possible to eliminate the latching action of the lug 55 with the wall 17 of the cutout 15, said latching action being illustrated in FIG. 1B. This forms a releasable latching device 55b, as a result of which the spring hinge 1 can be dismantled again if the closure part 7 together with the hinge part 5 and the spring 9 are to be removed from the housing 3 again. The through-passage 3C may be realized as a bore.

The wall 17, which is formed by a boundary wall 17B of the cutout 15, is arranged on the top side 3b of the housing in the exemplary embodiment according to FIG. 1B.

It can also be seen from FIG. 1B that the housing 3 is realized as a closed housing which comprises a housing base 3A which is integral with the rest of the housing walls. This means that the housing 3 is designed merely to be open on its end side, with the result that it is possible to introduce the hinge part 5 together with the closure part 7 and the spring 9 into the housing 3.

The closure part 7 is supported on an inner wall of the housing by way of its web 47. A bottom support is formed by an elevation E which projects into the housing interior and is formed by preferably two webs S running transversely to the longitudinal direction of the housing 3. The closure part 7 is thus spaced apart from the housing base 3A. The webs S are preferably formed integrally with the housing base 3A or housing 3.

Figure 1C:
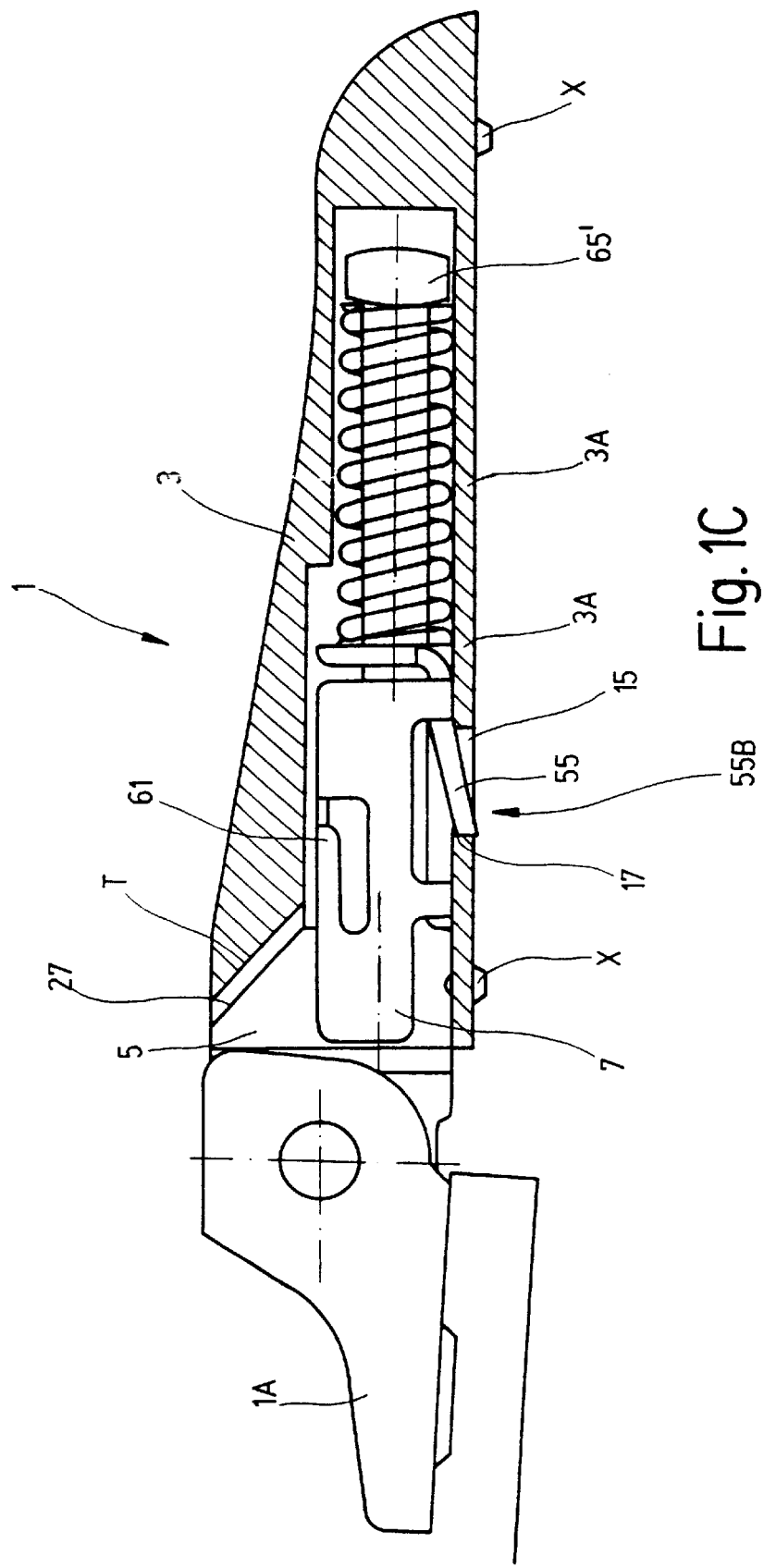
FIG. 1C shows a further exemplary embodiment of a spring hinge.

A further exemplary embodiment of a spring hinge 1 is represented in FIG. 1C. This differs from the spring hinge 1 according to FIG. 1B in that the closure part 7 has been introduced into the housing 3 in a state in which it has been rotated through 180° about its longitudinal axis. The lug 55 thus interacts with a cutout 15 which, in this case, is formed on the housing base 3A. Said cutout 15 may be realized as a through-passage, with the result that the lug 55 is supported on the wall 17 of the cutout 15, the latching device 55B being realized as a result.

Since the closure part 7 is arranged in a rotated state in the housing 3, use is made of a hinge part 5 which has, on its top side 29', the cutout 31', which is illustrated by dashed lines in FIG. 4a. The elastic tongue 61 of the closure part 7 thus interacts with said cutout 31', which is provided on the top side 29'. Of course, it is also possible to provide a hinge part 5 which has a cutout 31 both on the underside 29 and on the top side 29', with the result that just one design of the hinge part has to be produced for different housings and closure parts inserted differently into the housing, it being possible for said hinge part nevertheless to interact in each housing or with each closure. Otherwise, parts which are the same as in FIGS. 1A, 1B and 2 to 4 are provided with the same designations and, in this respect, they will not be described again.

At least one welding projection X and if appropriate also two, but in particular four, welding protrusions X is/are provided on the underside of the housing base 3A in FIG. 1C, in each case two welding projections X being assigned to one end of the housing base 3A and being located one behind the other in FIG. 1C, so that just one welding projection X can be seen. The welding projections X serve for connecting a side piece 69 of the spectacles (FIG. 1B) to the housing 3 by welding. In a welding operation, the welding projections X are heated, with the result that they can be deformed and thus undergo fixed connection to the side piece 69 of the spectacles.

Figure 6:
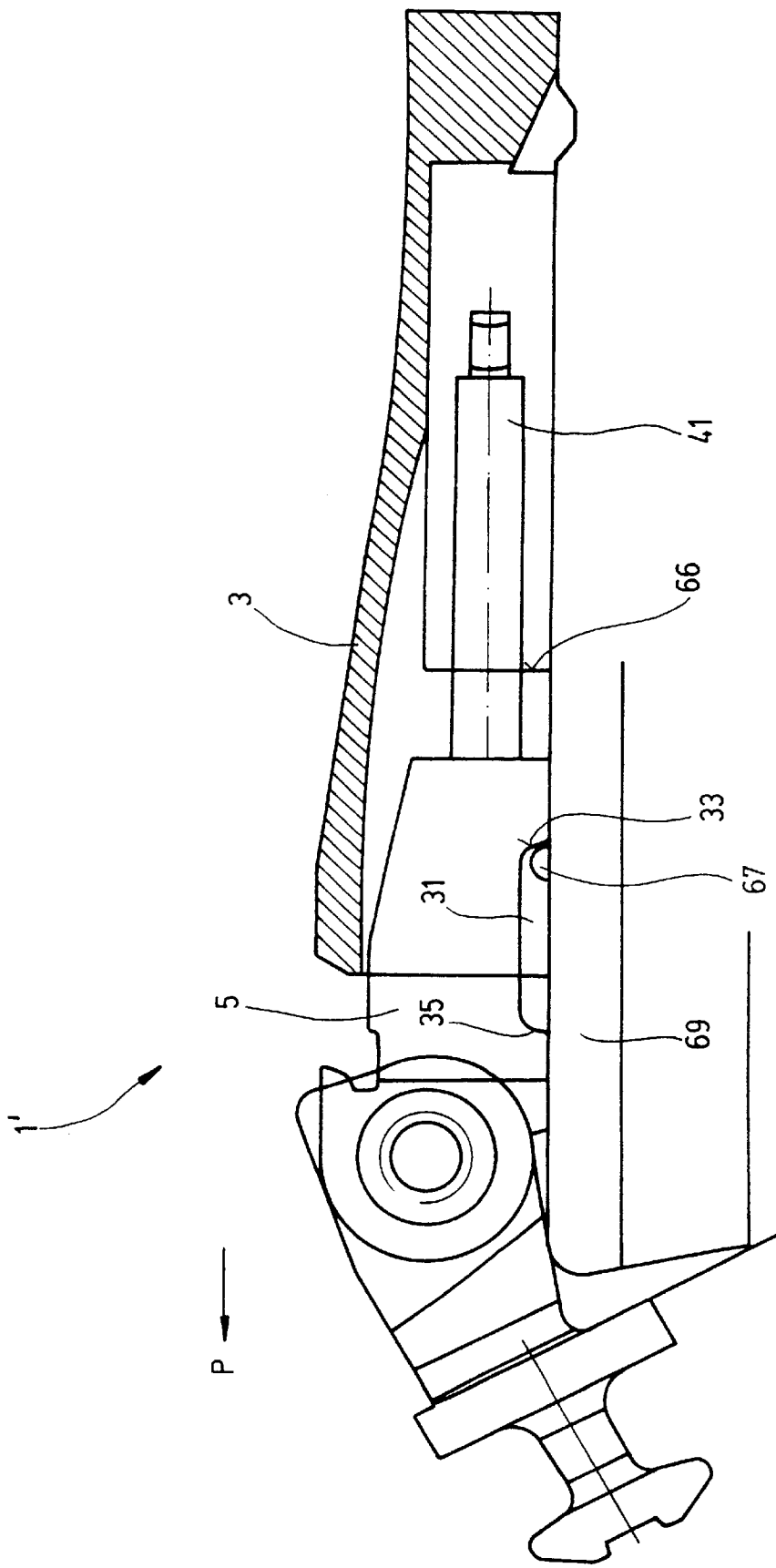
FIG. 6 shows the exemplary embodiment shown in FIG. 5, in a second position.

A further exemplary embodiment of the invention is illustrated in FIGS. 5 and 6. The spring hinge 1', which is shown in FIG. 5, corresponds in terms of functioning to the spring hinge 1, which has already been described with reference to FIG. 1. The parts with the same designations will thus not be described. Furthermore, for the sake of clarity, not all the components are depicted. For example, it is not possible to see that the closure part, which serves for abutment for the spring, is part of the housing 3. The abutment is formed by a constriction of the cutout 11, which is indicated purely schematically by a line 66.

In the present exemplary embodiment, the hinge part 5 also has a cutout 31 which is bounded in the longitudinal direction by the two shoulders 33 and 35. A protrusion 67 projects into the cutout 31 in the region between the two shoulders 33, 35. Said protrusion 67 is provided on the underside 13.3 of the housing 3. For production reasons, this exemplary embodiment can be realized when the underside 13.3 is formed by a side piece 69 of the spectacles. During assembly, the unit, comprising the housing 3 and hinge part with the spring 9, is positioned on the side piece 69 of the spectacles by way of the open side 13.3 of the housing 3, such that the protrusion 67 projects into the cutout 31.

If the hinge part 5 is then displaced in the direction of the arrow P, then the distance between the protrusion 67 and shoulder 33, said distance being marked by w, decreases continuously. As soon as the maximum desired displacement distance has been reached, the shoulder 33 strikes against the protrusion 67 and thus prevents further displacement in the direction of the arrow P. As in the first exemplary embodiment, this thus provides a stop device comprising the two stop elements 67 and 33. Here too, the production of the stop device is very straightforward since all that is required is to provide the protrusion 67 on the side piece 69. Further components are not necessary.

Figure 7:
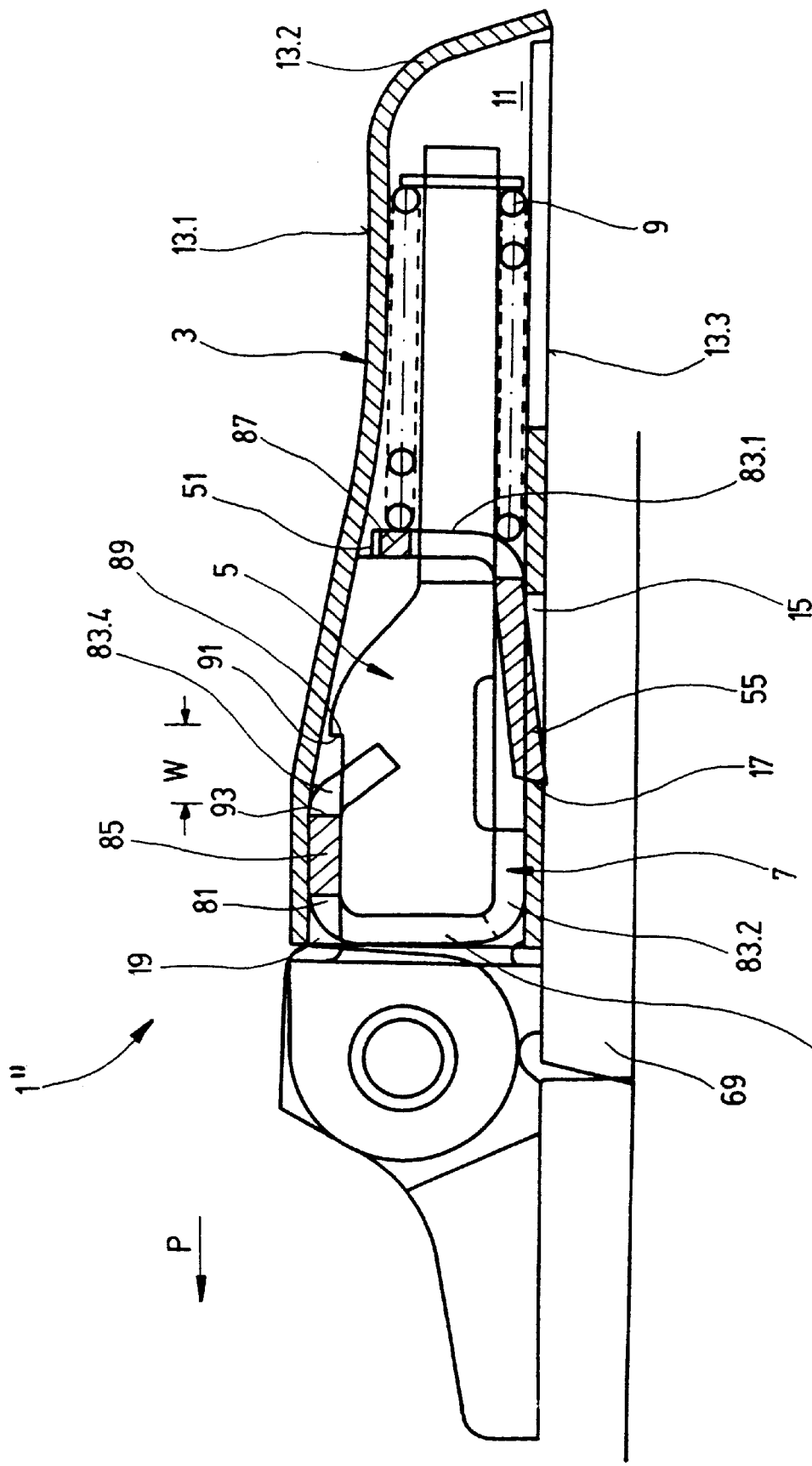
FIG. 7 shows a schematic illustration of a fifth exemplary embodiment of a spring hinge in a first position.
Figure 8:
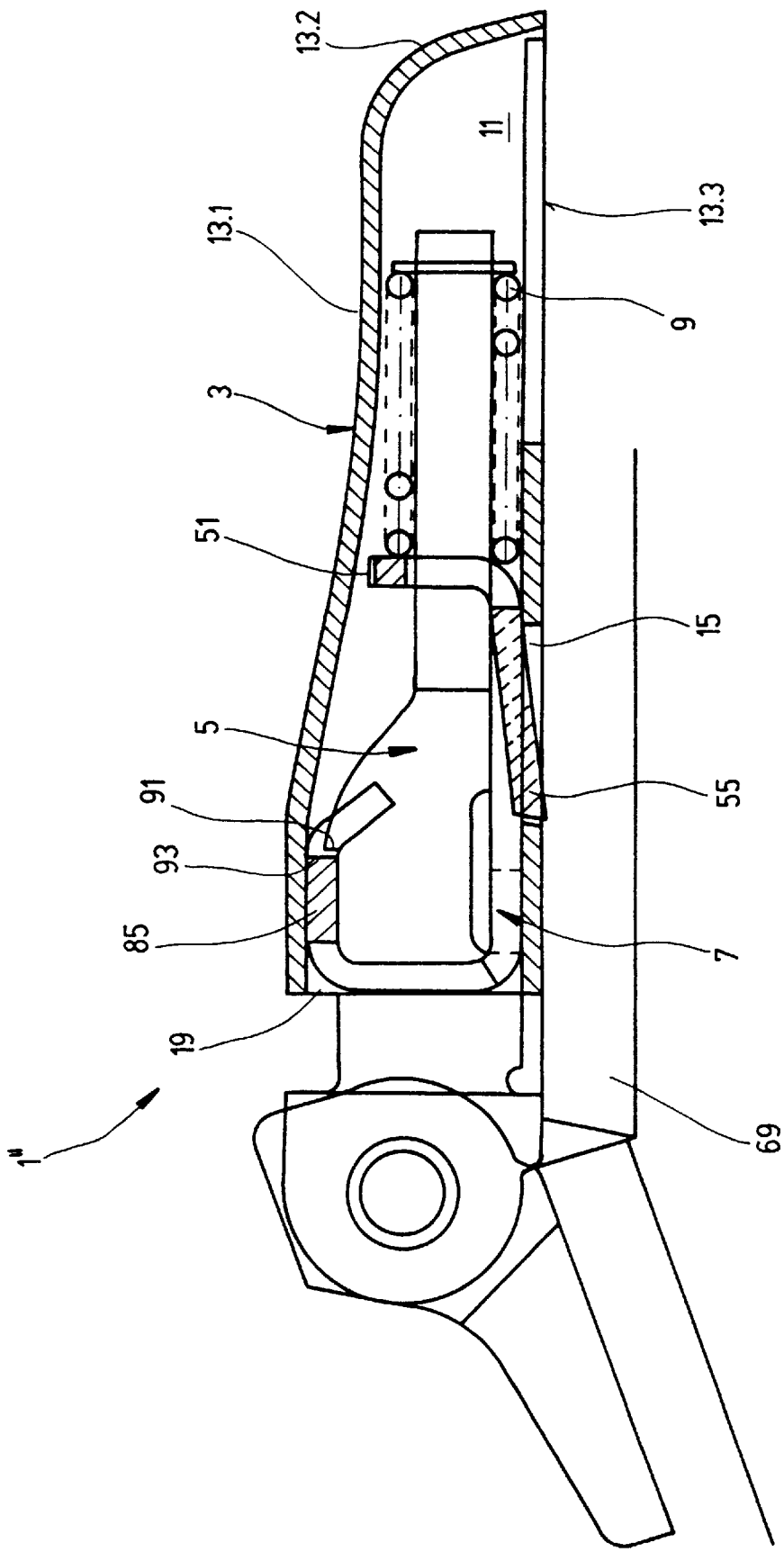
FIG. 8 shows the exemplary embodiment shown in FIG. 7, in a second position.

A third exemplary embodiment of the invention is illustrated in FIGS. 7 and 8. The spring hinge 1″, which is shown in FIG. 7, corresponds in terms of functioning to the spring hinge 1, which has already been described with reference to FIG. 1. The parts with the same designations will thus not be described.

The closure part 7 comprises two side elements 81 which are arranged parallel to one another and assume the function of the two side walls 43, 45 of the closure part 7 shown in FIG. 3. Just one of the two side elements 81 can be seen in the two FIGS. 7 and 8. In contrast to the first exemplary embodiment, the two side elements 81 are of barlike, rather than sheet-like, design. The two side elements 81 are designed such that a longitudinal section 83.1 forms the termination element 51, an adjoining longitudinal section 83.2 runs parallel and adjacent to the underside 13.3 of the housing, an adjoining longitudinal section 83.3 extends parallel to the opening 19, and an end section 83.4 runs adjacent to the top side 13.1 of the housing. The two side elements 81 are connected to one another, inter alia, via a web 85, extending perpendicularly to the plane of the drawing, in the region of the longitudinal section 83.4 and a further web 87, which likewise extends perpendicularly to the plane of the drawing. Of course, it is possible to provide further connecting elements.

The lug 55 is provided in the region of the longitudinal section 83.2 of the closure part 7, that is to say on one or both side elements 21, and interacts with locking action with the cutout 15, which is provided on the underside 13.3 of the housing 3. This locking action corresponds to that of the first exemplary embodiment. The only difference is that the lug 55 and cutout 15 are provided in the region of the bottom side 13.3 of the housing.

On a side which is directed toward the top side 13.1 of the housing, the hinge part 5 has a step 89, of which the step surface 91 runs perpendicularly to the longitudinal direction of the spring hinges 1″. The step surface 91 is directed toward a surface 93 of the web 85, said surface likewise running perpendicularly to the longitudinal direction of the spring hinge 1″. In relation to the opening 19, the step 89 is provided on the hinge part 5 behind the web 85. In FIG. 7, the distance between the surface 93 of the web 85 and the step surface 91 is marked by w.

If the hinge part 5 is displaced in the arrow direction P, then the distance defined between the surface 83 and the step surface 91 decreases continuously. As soon as the hinge part 5 has been displaced by a predetermined distance, the step surface 91 strikes against the surface 93 of the web 85 and thus prevents the hinge part 5 from being drawn out further. This position is illustrated in FIG. 8. It can clearly be seen that the step surface 91 butts against the surface 93 of the web 85.

Since the closure part 7 is a standard component, all that is required in order to provide this stop device comprising the two stop elements 91 and 93 is for the step surface 91 to be introduced on the hinge part 5. There is no need for any other changes. This also makes it possible to achieve, in this exemplary embodiment, a cost-effective internal stop which is easy to produce.

In all the exemplary embodiments described, it has to be ensured that the distance w, which specifies the maximum displacement distance, is selected such that the spring 9 is not compressed to the full extent when the shoulder 33 reaches the stop element 63 or 67.

Of course, it is also conceivable to have other solutions for a stop element which interact with the shoulder 33 or another surface 91 of the hinge part 5.

In a preferred embodiment, the housing 3 of the spring hinge 1, 1′, 1″ is produced by powder injection molding or metal injection molding. In this process, a suitable metal powder is mixed with a pulverulent binder. Particular importance is preferably attached to homogenous mixing of the two basic substances.

The metal-powder/binder mixture is preferably heated in a suitable injection-molding machine and introduced under pressure into a mold, of which the contour corresponds to the housing 3 of the spring hinge 1, 1′, 1″. The mold is provided with a core which is arranged and designed to form the cutout 11 and preferably the cutout 15 and the through-passage 3C. Of course, however, it is also possible for the cutout 15 and the through-passage 3C to be introduced once the housing 3 has been produced. The injection-molding operation, which takes place in a manner similar to a plastic injection-molding process, produces a first so-called preform of the housing 3.

Following the injection-molding operation, the first preform is removed from the mold and the core is drawn out, with the result that the cutout 11 and, if appropriate, the cutout 15 and the through-passage 3C are formed. The cutout 11 thus need not be produced in a material-removing machining operation, which considerably reduces the production costs for the spring hinge. Moreover, the cutouts and, if appropriate, the through-passage have very accurate dimensions and are particularly smooth. It is particularly advantageous that the exterior of the spring hinge 1 can be designed in a cylindrical manner without additional processing or production steps being required. This makes it possible to realize a spring hinge which is particularly aesthetically pleasing.

The first preform of the housing is heated in order to produce a second preform, as a result of which the binder is expelled from the first preform.

The first preform is sintered in a further step, it being possible to use a conventional sintering furnace.

This process step produces the finished housing 3. If required, surface hardening may also be carried out, although this is not usually necessary, which is a great advantage of the process.

It is also particularly advantageous that the metal powder can be selected freely. In particular, it is also possible to use a titanium powder for the production of the spring housing 3.

What is claimed is:

1. A spring hinge for spectacles, having a housing (3), a hinge part (5), which is arranged such that it can be displaced at least partially within the housing (3), a closure part (7), which is arranged in the housing (3), a spring (9), which is supported on the hinge part (5), on the one hand, and on the closure part (7), on the other hand, and having a stop device which has two stop elements, wherein a first stop element (33) is arranged on the hinge part (5), and a second stop element (63) is arranged on the closure part (7), it being the case that the hinge part (5), in order to form the first stop element (33), forms a cutout (31, 31') which, in the displacement direction of the hinge part (5), is located in one plane with an elastic tongue (61) of the closure part (7), said tongue being bent toward the hinge part (5) and engaging in the cutout (31, 31'), and wherein a maximum displacement path (W) of the hinge part (5), said displacement path being limited by the stop device, is smaller than the maximum spring excursion of the spring element (9).

2. The spring hinge as claimed in claim 1, wherein the second stop element (63) engages in the cutout (31), and wherein a wall (33) of the cutout (31, 31') forms the first stop element.

3. The spring hinge as claimed in claim 2, wherein the cutout (31, 31') is provided on that side of the hinge part (5) which is directed toward the underside or top side of the housing (3).

4. The spring hinge as claimed in claim 1, wherein the closure part (7) encloses at least one longitudinal section (25) of the hinge part (5) and serves as a guide.

5. The spring hinge as claimed in claim 1, wherein the closure part (7) has a locking element (55) and the housing (3) has a cutout (15), the locking element (55) being designed such that it can be latched into the cutout (15).

6. The spring hinge as claimed in claim 1, wherein one longitudinal end of the tongue (61) is provided on the closure part (7), and wherein the other longitudinal end (63) is free and engages in the cutout (31) of the hinge part (5).

7. The spring hinge as claimed in claim 6, wherein the closure part (7) and the tongue (61) are designed in one piece.

8. The spring hinge as claimed in claim 1, wherein the closure part (7) has a resilient lug (55) which has a free end (55A) and interacts, as latching device (55B), with a wall (17) formed on the housing (3).

9. The spring hinge as claimed in claim 8, wherein the wall (17) is formed on the top side (3B) of the housing or on the base (3A) of the housing.

10. The spring hinge as claimed in claim 9, wherein the wall (17) is a boundary wall (17B) of the cutout (15).

11. The spring hinge as claimed in claim 8, wherein the housing (3) has a through-passage (3C) through which the elastic lug (55) can be actuated.

12. The spring hinge as claimed in claim 11, wherein the through-passage (3C) opens out in the cutout (15).

13. The spring hinge as claimed in claim 8, wherein the closure part (7) is spaced apart from the housing base (3A).

14. The spring hinge as claimed in claim 13, wherein provided on the housing base (3A) is an elevation (E) which projects into the housing interior.

15. The spring hinge as claimed in claim 14, wherein the elevation (E) is formed by two webs (S) running transversely to the longitudinal direction of the housing (3).

16. The spring hinge as claimed in claim 15, wherein the webs (S) are formed integrally with the housing base (3A).

17. The spring hinge as claimed in claim 1, wherein the housing (3) is produced by powder injection molding PIM or metal injection molding MIM.

* * * * *